(12) United States Patent
Matsuda

(10) Patent No.: US 8,068,883 B2
(45) Date of Patent: Nov. 29, 2011

(54) HANDS-FREE APPARATUS

(75) Inventor: Naoki Matsuda, Anjo (JP)

(73) Assignee: DENSO Corporation, Kariya (JP)

( * ) Notice: Subject to any disclaimer, the term of this patent is extended or adjusted under 35 U.S.C. 154(b) by 982 days.

(21) Appl. No.: 11/880,841

(22) Filed: Jul. 24, 2007

(65) Prior Publication Data

US 2008/0051156 A1 Feb. 28, 2008

(30) Foreign Application Priority Data

Aug. 22, 2006 (JP) ................... 2006-225320

(51) Int. Cl.
*H04M 1/00* (2006.01)

(52) U.S. Cl. .............. 455/569.1; 455/569.2; 455/417; 455/41.3; 455/41.2; 455/345

(58) Field of Classification Search ........... 455/569.1, 455/569.2, 417, 41.3, 345, 41.2
See application file for complete search history.

(56) References Cited

U.S. PATENT DOCUMENTS

| | | | |
|---|---|---|---|
| 7,155,200 B2 * | 12/2006 | Tamura et al. | 455/403 |
| 2005/0070336 A1 * | 3/2005 | Tamura | 455/567 |
| 2006/0079182 A1 | 4/2006 | Matsuda | |

FOREIGN PATENT DOCUMENTS

| | | |
|---|---|---|
| JP | 2002-223288 | 8/2002 |
| JP | 2002-319889 | 10/2002 |
| JP | 2006-074424 | 3/2006 |
| JP | 2006-109292 | 4/2006 |
| JP | 2006-148864 | 6/2006 |

OTHER PUBLICATIONS

Office action dated Dec. 15, 2009 in corresponding Japanese Application No. 2006-225320.

* cited by examiner

*Primary Examiner* — Dwayne Bost
*Assistant Examiner* — Amancio Gonzalez
(74) *Attorney, Agent, or Firm* — Harness, Dickey & Pierce, PLC

(57) ABSTRACT

A connection of a hands-free apparatus to a cellular phone is established through a hands-free profile, and the connection of the hands-free apparatus to the cellular phone through the hands-free profile is switched from the cellular phone to another cellular phone when a data communication is triggered. Then, the hands-free apparatus establishes another connection to the cellular phone through a dial-up network profile so that a hands-free call by the hands-free apparatus is appropriately handled.

7 Claims, 3 Drawing Sheets

HANDS-FREE APPARATUS

CROSS REFERENCE TO RELATED APPLICATION

This application is based on and claims the benefit of priority of Japanese Patent Application No. 2006-225320 filed on Aug. 22, 2006, the disclosure of which is incorporated herein by reference.

FIELD OF THE DISCLOSURE

The present disclosure generally relates to a hands-free apparatus for a vehicle.

BACKGROUND INFORMATION

In recent years, a Bluetooth communication function enabled vehicular hands-free apparatus (a hands-free apparatus hereinafter for brevity) is configured to communicate with a Bluetooth communication function enabled cellular phone (a cellular phone hereinafter for brevity and simplicity) by connecting a hands-free profile for serving a hands-free call as disclosed, for example, Japanese patent document JP-A-2002-223288.

However, the hands-free apparatus is capable of serving a hands-free call for the cellular phone only when the hands-free apparatus is connecting the hands-free profile to the cellular phone, and the apparatus is not capable of serving a hands-free call for the cellular phone when, for example, a data communication is triggered due to switching of the connection type from the hands-free profile to a dial-up network profile, that is, due to a disconnection of the hands-free profile to switch to a connection of the dial-up network profile. Therefore, while the dial-up network profile is connected and the hands-free profile is disconnected, the hands-free apparatus is not capable of serving the hands-free call for the cellular phone.

In this case, if the cellular phone is configured to have simultaneous connection of multiple profiles, the hands-free apparatus can provide a connection of the hands-free profile as well as a connection of the dial-up network profile at the same time for enabling the data communication in a stand-by condition of serving the hands-free call. However, if the cellular phone is not configured to have simultaneous connection of multiple profiles, the simultaneous connection of the dial-up network profile for the data communication and the hands-free profile for establishing the hands-free call is not possible.

SUMMARY OF THE DISCLOSURE

In view of the above and other problems, the present disclosure discloses a hands-free apparatus that appropriately serves a hands-free call for a cellular phone.

A control unit of the hands-free apparatus in the present disclosure connects a hands-free call protocol to the cellular phone having the short range radio communication function when there is the cellular phone having the short range radio communication function in a connectable condition through a hands-free call protocol in a hands-free call disabled situation where the hands-free call by using an apparatus other than the cellular phone having the short range radio communication function is not possible.

In this manner, even when the hands-free call by using an apparatus other than the cellular phone having the short range radio communication function is not possible, the hands-free apparatus of the present disclosure connects the hands-free call protocol to the cellular phone having the short range radio communication function to appropriately wait for a hands-free call by utilizing the cellular phone in the hands-free call protocol connected condition if the cellular phone having the short range radio communication function in a hands-free call connectable condition is available.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings.

Figure 1:
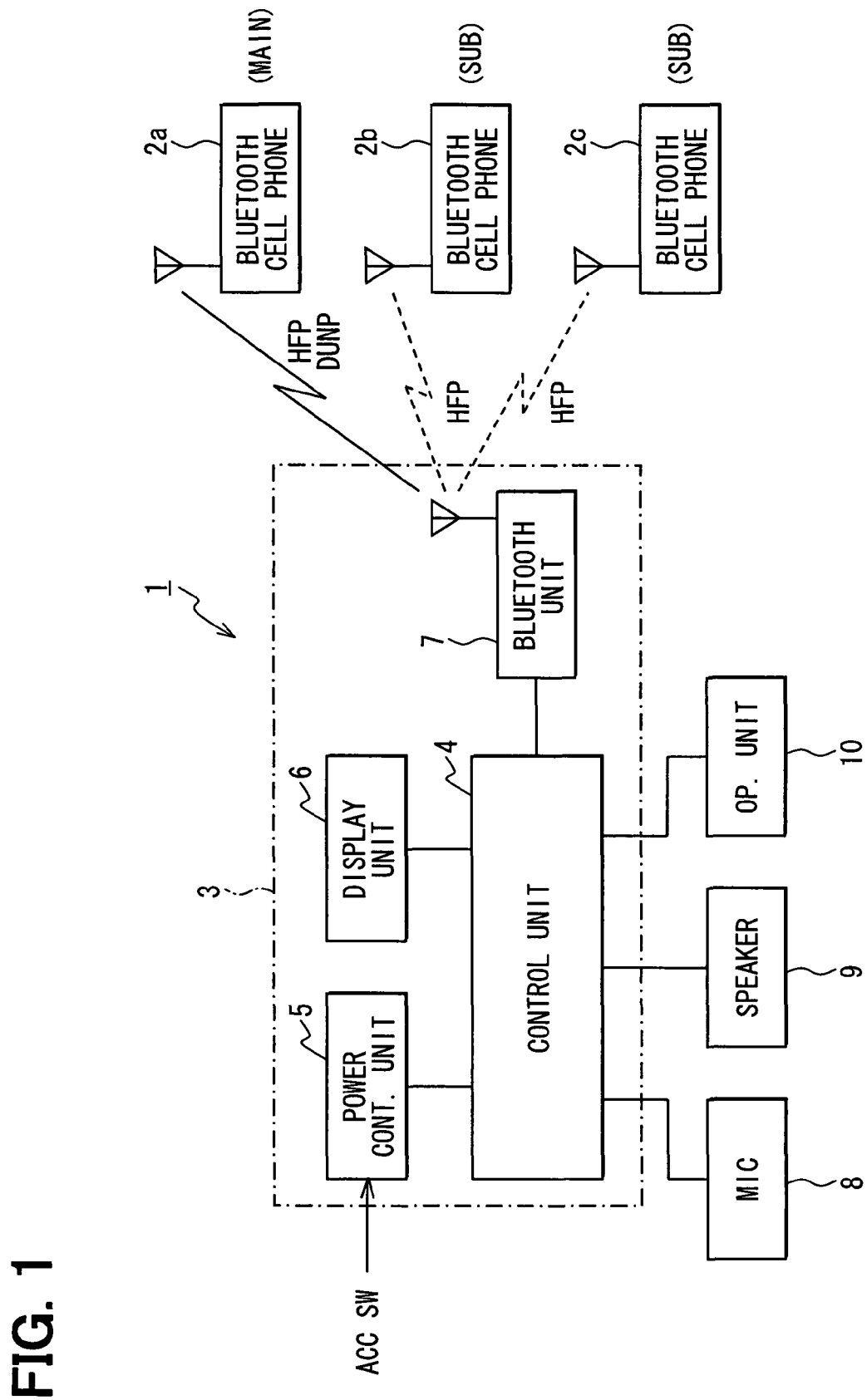
FIG. 1 shows a block diagram of a hands-free apparatus in a first embodiment of the present disclosure.

FIG. 1 shows a block diagram of a hands-free system 1 for use in a vehicle. The hands-free system 1 includes cellular phones 2a-2c having Bluetooth communication function and a vehicular hands-free apparatus 3 (hereinafter designated as hands-free apparatus 3) having Bluetooth communication function. The cellular phone 2a-2c and the hands-free apparatus 3 are configured to be connectable with each other through Bluetooth communication.

The cellular phones 2a-2c are connectable to other cellular phone or fixed telephone through a cellular phone network, and are enabled to have Bluetooth communication with the hands-free apparatus 3 when a power supply is turned on within a communication range.

The hands-free apparatus 3 includes a control unit 4, a power control unit 5, a display unit 6, and a Bluetooth unit 7. The control unit 4 includes a CPU, a RAM, a ROM and the like for executing a control program that controls an entire operation of the hands-free apparatus 3.

The power control unit 5 is configured to have an ACC on signal from an ACC switch when the switch is turned on, and have an ACC off signal from the ACC switch when the switch is turned off. When the ACC on signal is input from the switch, the power control unit 5 allows a supply of an operation power to the control unit 4 to start an entire apparatus, and when the ACC off signal is input from the switch, the power control unit 5 prohibits the supply of the operation power to the control unit 4 to stop the entire apparatus. In this case, the power control unit 5 is configured to watch an input of the ACC on signal on a minimum operation power even when the hands-free apparatus 3 is in a turned-off condition.

The display unit 6 is configured to perform a display operation according to a display instruction signal when the instruction signal is input from the control unit 4. The Bluetooth unit 7 is configured to perform a Bluetooth communication operation according to an operation instruction signal when the instruction signal is input from the control unit 4. In this case, the Bluetooth unit 7 is in a connectable condition that enables a connection of a hands-free profile (HFP: a hands-free protocol of a hands-free call in the present invention) to the cellular phones 2a-2c, and is also in a connectable condition that enables a connection of a dial-up network profile (DUNP: other protocol of a function other than the hands-free call in the present invention) to the cellular phone 2a.

The control unit 4 sends a speaker's voice from a microphone 8 to the cellular phones 2a-2c through the Bluetooth unit 7 when the hands-free profile is connected to the cellular phones 2a-2c, and outputs a caller's voice from a speaker 9 when the cellular phones 2a-2c sends in the voice through the Bluetooth unit 7. In addition, the control unit 4 performs an operation according to an operation signal from the operation unit 10 when the operation signal represents user's operation on the operation unit 10. In this case, the functions of the hands-free apparatus 3 may be built into a navigation apparatus for the vehicle (not shown in the figure) for enabling the Bluetooth communication between the navigation apparatus and the cellular phone.

Figure 2:
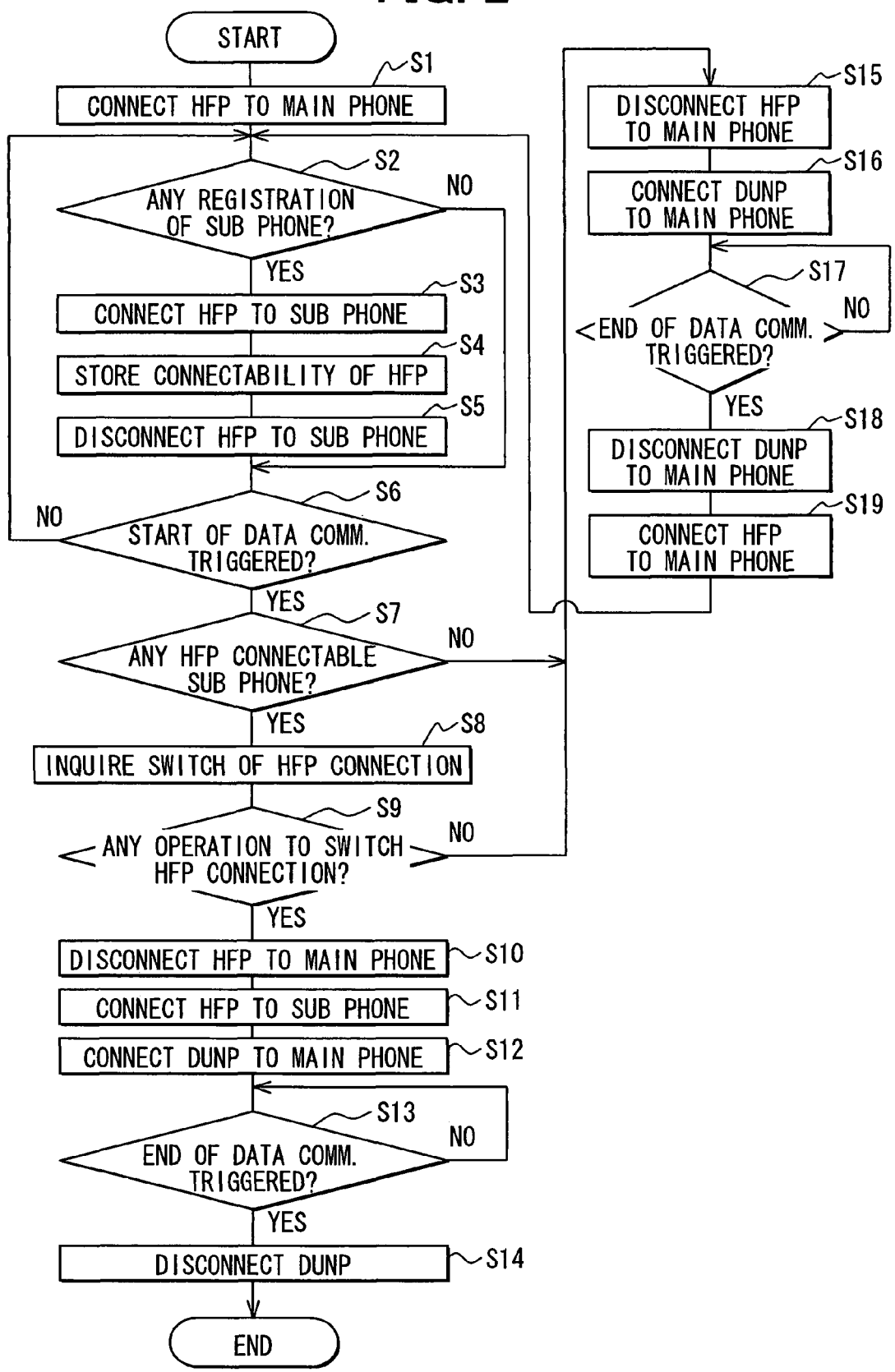
FIG. 2 shows a flowchart of a process in the hands-free apparatus in the first embodiment of the present disclosure.

Then, an operation of the above-described apparatus is described with reference to FIG. 2. In this case, as a prerequisite, the control unit 4 has a registration of the cellular phone 2a as a main phone and registration of the cellular phones 2b, 2c as sub phones. Also as a prerequisite, the cellular phones 2b, 2c are connectable through the hands-free profile. In addition, when the start of a data communication is triggered, the control unit 4 makes the dial-up network profile to be connected.

The control unit 4 of the hands-free apparatus 3 connects the HFP to the cellular phone 2a when it detects the turn on of the ACC switch upon having an input of the ACC on signal from the ACC switch to the power control unit 5 (step S1).

Then, the control unit 4 determines whether a sub phone is registered (step S2), and connects the HFP to one of the cellular phones 2b, 2c being registered as the sub phone (step S3) when the registration of the sub phone is confirmed (step S2:YES). Then, whether the HFP is connectable is determined.

In this case, the control unit 4 may, for example, determine the connectability of the HFP based on a predetermined order when there are plural sub phones in the registration, or may determine the connectability of the HFP based on an order of radio wave intensity from those cellular phones. In addition, the connection of the HFP is described in the present embodiment, a performance of an operation that at least determines the connectable condition of the profile such as an authentication process or the like is sufficient at this stage.

Then, the control unit 4 stores a determination result of the connectability of one of the cellular phones 2b, 2c registered as the sub phone in a memory (step S4), and disconnects the HFP to one of the cellular phones 2b, 2c (step S5). In this case, the registration of the sub phone by the control unit 4 is determined, for example, at an interval of several dozens of seconds.

Then, the control unit 4 determines whether the start of the data communication is triggered (step S6), and the process returns to step S2 to repeat the above procedure when the start of the data communication is not triggered (step S6:NO). On the other hand, the control unit 4 refers to the determination result of the connectability of the HFP stored in the memory and determines whether there is the sub phone that can be connectable through the HFP when triggering the start of the data communication is detected (step S6:YES).

In this case, the control unit 4 displays a message on a screen on the display unit 6 for an inquiry that inquires the user whether he/she switches the connection of the HFP from the main phone to the sub phone (step S8). For example, the message on the screen may read "Switch the HFP from the main phone to the sub phone." In this manner, the user can selectively determine whether to switch the connection of the HFP from the main phone to the sub phone.

Then, the control unit 4 disconnects the connection of the HFP to the cellular phone 2a when the user operation that indicates the switch of the HFP connection from the main phone to the sub phone is detected (step S9:YES). Then, the control unit 4 disconnects the connection of the HFP to the cellular phone 2a (step S10), and connects the connection of the HFP to one of the cellular phones 2b, 2c that are registered as the sub phones in the connectable condition of the HFP (step S11).

In this case, the control unit 4 may connect the HFP to, for example, a cellular phone that is at a top priority in a predetermined connection order, or may connect the HFP to a cellular phone that radiates the most intensive radio wave when there are plural cellular phones that are in the HFP connectable condition. In addition, the control unit 4 may display a connection priority list on the screen in a predetermined order for allowing the user to select the connection destination of the HFP.

Then, the control unit 4 connects the DUNP to the cellular phone 2a that is registered as a main telephone (step S12) for the data communication. Then, the control unit 4 determines whether the end of the data communication is triggered (step S13), and disconnects the DUNP to the cellular phone 2a that is registered as the main phone (step S14) when the end of the data communication is detected (step S13:YES). In this manner, the process of the control unit 4 is concluded.

Thus, the hands-free apparatus 3 connects the HFP to one of the sub phones 2b, 2c that are in the HFP connectable condition and registered as the sub phones while the DUNP is connected to the cellular phone 2a.

In this case, the control unit 4 disconnects the connection of the HFP (step S15) when there is no sub phone to be connected through the HFP (step S7:NO), or when the user did not performs the operation that indicates the switch of the HFP from the main phone to the sub phone (step S9:NO). Further, the control unit 4 does not connect the HFP to neither of the cellular phones 2b, 2c that are registered as the sub phones to connect to the main cellular phone 2a through the DUNP to establish the data communication (step S16).

Then, the control unit 4 disconnects the DUNP to the cellular phone 2a that is registered as the main phone (step S18) when the end of the data communication is triggered (step S17:YES). Further, the control unit 4 connects the HFP to the cellular phone 2a that is registered as the main phone (step S19). That is, the communication condition before triggering the start of the data communication is restored, and the process returns to step S2 to repeat the above procedures.

The description in the above describes a situation where the connection of the HFP is switched from the main phone to the sub phone by disconnecting the HFP to the main phone before connecting the HFP to the sub phone. However, if the HFP is simultaneously connectable to plural cellular phones, the connection of the HFP to the sub phones may precede the disconnection of the HFP to the main phone.

According to the above description of the first embodiment, a connection of the hands-free profile between the hands-free apparatus 3 and the cellular phone 2a being registered as the main phone is switched to a connection of the hands-free profile between the hands-free apparatus 3 and one of the cellular phones 2b, 2c being registered as sub phones when a data communication is triggered for establishing a connection of the dial-up network profile between the hands-free apparatus 3 and the cellular phone 2a being registered as the main phone, thereby enabling an appropriate hands-free waiting condition by utilizing one of the cellular phones 2b, 2c that is in a hands-free protocol established condition.

Further, when the user's choice that indicates a switch of HFP connection from the main phone 2a to one of the sub phones 2b, 2c is inputted from a screen, the HFP connection is switched from the main phone 2a to one of the sub phones 2b, 2c, thereby enabling a switch of the HFP connection for accommodating user's intention.

Furthermore, when a data communication end trigger arises to disconnect the DUNP connection to the main phone 2a, the HFP connection to one of the sub phones 2b, 2c can be continued due to a configuration of maintenance of an immediately-after-disconnection condition, thereby enabling an appropriate waiting condition for the hands-free call with one of the registered sub phones 2b, 2c after disconnection of the DUNP.

Figure 3:
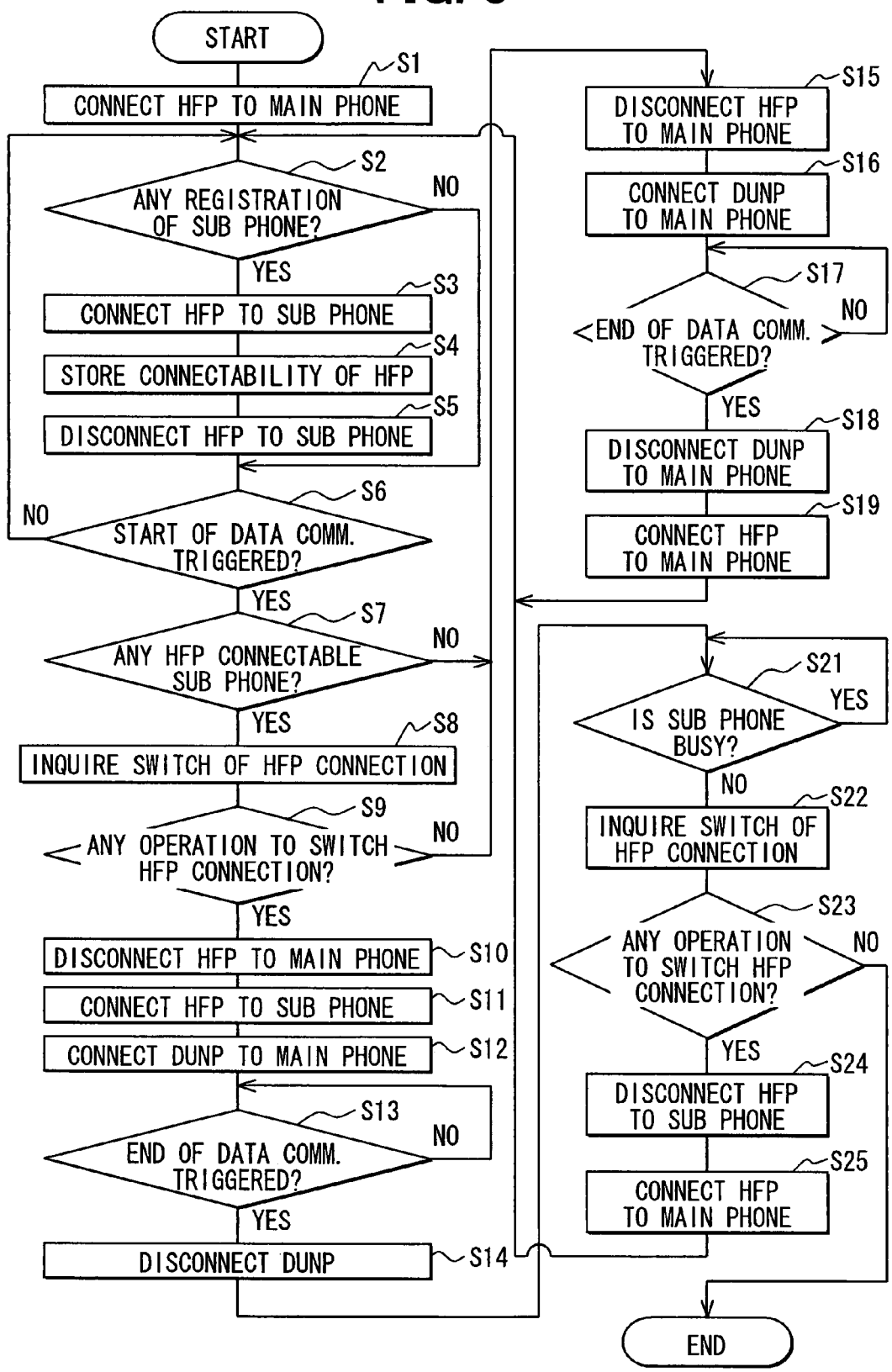
FIG. 3 shows a flowchart of a process in the hands-free apparatus in a second embodiment of the present disclosure.

A second embodiment of the present disclosure is described with reference to FIG. 3. The like parts and procedures has like numbers as used in the first embodiment, and the difference is focused to the difference of the two embodiments. The second embodiment allows the user to choose from two options, that is, whether to switch the connection of the HFP from the sub phone to the main phone, or not to switch the connection of the HFP. In other words, the user determines whether or not to return to the communication condition before the start of the data communication is triggered.

The process in the control unit 4 in the second embodiment is described in the following. That is, when the control unit 4 detects the end of the data communication is triggered (step S13:YES), it disconnects the connection of the DUNP to the cellular phone 2a that is registered as the main phone (step S14), and then it determines whether either of the cellular phones 2b, 2a in the connected condition of the HFP is busy (step S21).

When the control unit 4 detects that either of the cellular phones 2b, 2c is not busy (step S21:NO), it displays an inquiry message on the screen of the display unit 6 (step S22). The inquiry message may read "Would you like to switch HFP connection from sub phone to main phone?" In this manner, the user can choose from two options, that is, whether to switch the connection of the HFP from the sub phone to the main phone, or not to switch the connection. That is, in other words, the user can determine that the communication condition is returned to the state before the start of the data communication is triggered or not.

Then, when the control unit 4 detects that the user's operation has indicated the switch of the HFP connection from the sub phone to the main phone (step S23:YES), it disconnects the connection of the HFP to either of the cellular phones 2b, 2c that are registered as the sub phone (step S24), and connects the connection of the HFP to the cellular phone 2a that is registered as the main phone (step S25).

In this case, the HFP may be connected to the main phone first and then the HFP to the sub phone may be disconnected if the simultaneous connection of the HFP to multiple cellular phones is possible. Then, the control unit 4 returns to step S2 to repeat the above-described procedures. When the control unit 4 detects that the user has not provide an operation to switch the connection of the HFP from the sub phone to the main phone (step S23:NO), it concludes the process and the connection of the HFP is not switched from the sub phone to the main phone.

In the second embodiment, as the HFP connection is configured to be switched from either of the "sub" cellular phones 2b, 2c to the "main" cellular phone 2a when the end of the data communication is triggered, the communication condition can be returned to the state before the connection of the DUNP between the "main" cellular phone 2a and the hands-free apparatus 3 is established, thereby enabling an appropriate waiting condition of the hands-free call by utilizing the cellular phone 2a that is registered as the main phone.

Further, the user's intention is reflected to the switching of the HFP connection from the sub phone to the main phone due to the display of the inquiry message on the screen of the display unit 6.

Although the present invention has been fully described in connection with the preferred embodiment thereof with reference to the accompanying drawings, it is to be noted that various changes and modifications will become apparent to those skilled in the art.

For example, the connection operation scheme of the Bluetooth profile may also be applicable to an audio-visual profile (AVP), an object push profile (OPP), and a basic image profile (BIP) when the hands-free profile (HFP) is switched to another profile besides being switched to the dial-up network profile (DUNP).

The connection of the hands-free profile to the cellular phone in the hands-free profile connectable condition may be triggered by the start of the data communication with a vehicular radio with the telephone function beside being triggered by the start of the data communication with the cellular phone in the hands-free profile connected condition.

The number of the cellular phones that are registered as the sub phones may be only one, or may be more than three.

The screen display for inquiry that inquires the user to switch the HFP connection from the main phone to the sub phone may be skipped for automatically switching the HFP connection regardless of the user operation.

Whether the switching of the HFP from the main phone to the sub phone has been successful may be determined, and the connection of the HFP to a next priority in the predetermined order or to a next intensive radio wave may be attempted when the switching of the HFP has not been successful.

The frequency for determining the HFP connectability may be determined according to the estimation of the power consumption by the hands-free apparatus and/or the power consumption by the cellular phones.

Such changes and modifications are to be understood as being within the scope of the present invention as defined by the appended claims.

What is claimed is:

1. A hands-free apparatus for use in a vehicle comprising:
a short range radio communication unit capable of connecting a hands-free call protocol for establishing a hands-free call to a first cellular phone having a short range radio communication function and connecting another protocol that provides another function other than the hands-free call to the first cellular phone having the short range radio communication function; and
a control unit that controls a connection and a disconnection of the hands-free call protocol and the another protocol that connects to the first cellular phone having the short range radio communication function;
wherein the control unit i) switches a connection of the hands-free call protocol from the first cellular phone having the short range radio communication function to a second cellular phone having the short range radio communication function, ii) connects the another protocol between the short range radio communication unit and the first cellular phone, and iii) waits for a hands-free call using the second cellular phone, if (A) a connection request of the another protocol between the short range radio communication unit and the first cellular phone arises when the hands-free call protocol between the short range radio communication unit and the first cellular phone is established and (B) the second cellular phone capable of connecting the hands-free call protocol to the short range radio communication is known to exist.

2. The hands-free apparatus of claim 1,
wherein the short range radio communication unit is capable of providing a connection of at least one other protocol that serves one other function other than the hands-free call, and
the control unit switches a connection of the hands-free call protocol to one cellular phone having the short range radio communication function to another cellular phone having the short range radio communication function, connects the hands-free call protocol between the short range radio communication unit and the another cellular phone having the short range radio communication function, and connects the one other protocol between the short range radio communication function when a request for connection of the one other protocol between the short range radio communication unit and the one cellular phone having the short range radio communication function arises on a condition where the short range radio communication unit and the one cellular phone having the short range radio communication function are being connected through the hands-free protocol in an another cellular phone involved situation where the another cellular phone is existing to be connectable to the short range radio communication unit through the hands-free call protocol.

3. The hands-free apparatus of claim 2 further comprising:
a notification unit that notifies a user a notice,
wherein the control unit provides from the notification unit an inquiry notice for the user whether to switch the connection of the hands-free call protocol from the one cellular phone having the short range radio communication function to the another cellular phone having the short range radio communication function, and
the control unit switches the connection of the hands-free call protocol from the one cellular phone having the short range radio communication function to the another cellular phone having the short range radio communication function upon receiving from the user an indicative response of switching of the connection of the hands-free call protocol.

4. The hands-free apparatus of claim 2,
wherein the control unit continues to maintain a disconnection condition of the one other protocol where the one other protocol is being kept in a condition of immediately-after-disconnection from the cellular phone having the short range radio communication function when the hands-free call protocol has been connected between the short range radio communication unit and the one other cellular phone having the short range radio communication function before disconnection.

5. The hands-free apparatus of claim 2,
wherein the control unit switches the connection of the hands-free call protocol from the another cellular phone having the short range radio communication function to the one cellular phone having the short range radio communication function, and connects the hands-free call protocol between the short range radio communication unit and the one cellular phone having the short range radio communication function when the one other protocol between the short range radio communication unit and the one cellular phone having the short range radio communication function is disconnected after an establishment of the hands-free protocol between the short range radio communication unit and the another cellular phone having the short range radio communication function.

6. The hands-free apparatus of claim 5 further comprising:
a notification unit that notifies a user a notice,
wherein the control unit provides from the notification unit an inquiry notice for the user whether to switch the connection of the hands-free call protocol from the another cellular phone having the short range radio communication function to the one cellular phone having the short range radio communication function, and
the control unit switches the connection of the hands-free call protocol from the another cellular phone having the short range radio communication function to the one cellular phone having the short range radio communication function upon receiving from the user an indicative response of switching of the connection of the hands-free call protocol.

7. A hands-free apparatus for use in a vehicle, the hands-free apparatus comprising:
a short range communication unit connected to a first cellular phone through a first protocol, the short range communication unit being capable of connecting to the first cellular phone using a second protocol;
a control unit that controls a connection and disconnection of the first and second protocol; wherein
the control unit switches a connection of the first protocol from the first cellular phone to a second cellular phone, connects the second protocol between the short range communication unit and the first cellular phone, and waits for a hands-free call using the second cellular phone; if
a connection request of the second protocol between the short range communication unit and the first cellular phone arises when the short range communication unit is connected to the first cellular phone using the first protocol and the second cellular phone capable of connecting to the short range communication unit using the first protocol is known to exist.

* * * * *